June 9, 1959  V. L. OTT ET AL  2,890,060
COLLAPSIBLE CART
Filed Feb. 19, 1957
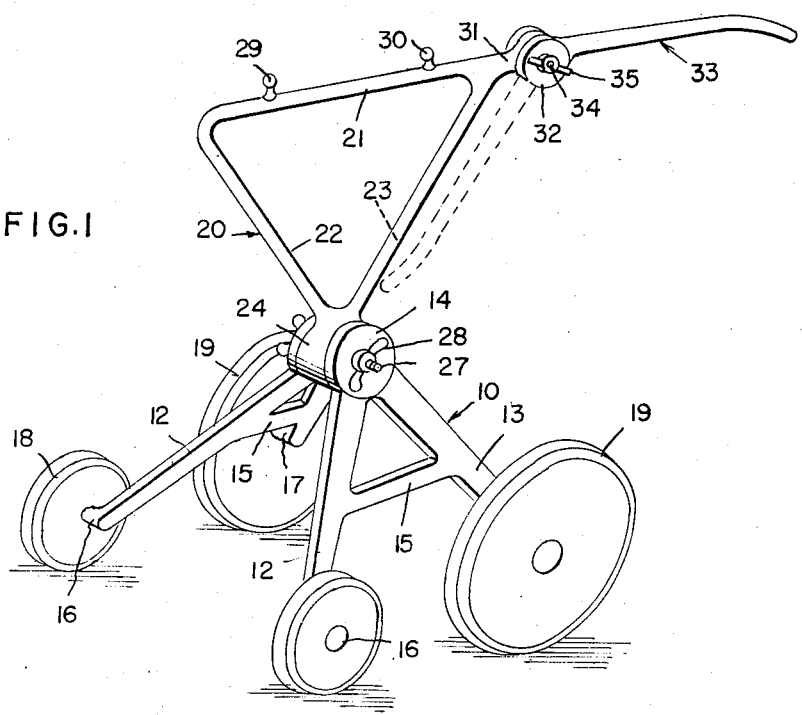
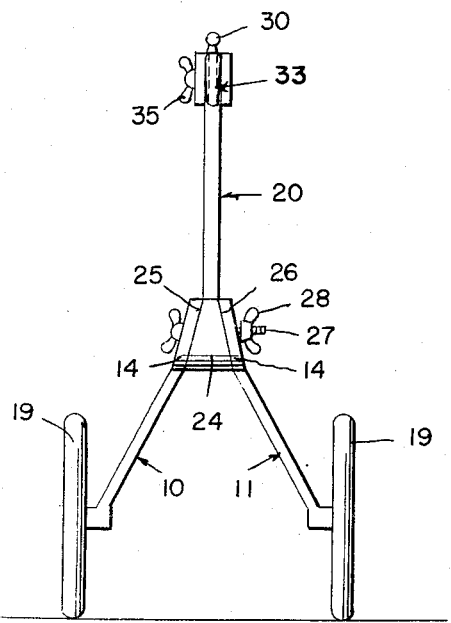
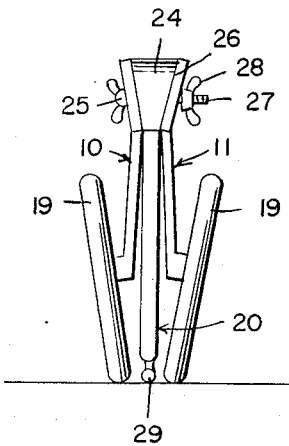
INVENTORS
Vivian L. Ott
Leger M. Joynes
BY
Shoemaker + Mattare
ATTYS

2,890,060

COLLAPSIBLE CART

Vivian L. Ott and Leger M. Joynes, Norfolk, Va.; said Joynes assignor to said Ott Application February 19, 1957, Serial No. 641,203

11 Claims. (Cl. 280—42)

This invention relates generally to collapsible vehicles and is directed more particularly to certain improvements therein wherein the mechanism used in effecting the collapsibility of the vehicle is of simple, yet effective, construction.

At the present time, there is considerable interest in collapsible type vehicles or carts since in many instances, space is at a premium and there is a large demand for all types of cart-like vehicles which can be readily and quickly collapsed for storage, during transportation or for any other purpose. For example, there are many types of collapsible golf carts presently available, their chief virtue being their compactness, when folded, so that a minimum of space is required for their storage. Consequently, they may be easily placed in the trunk compartment of an automobile or the like. Another type of collapsible vehicle which is currently in large demand is the collapsible baby carriage. Various types are presently available which easily fit within the confines of an automobile, in the trunk, back seat space or the like. Many specific examples could be given as to the various types of collapsible vehicles presently in demand, but it is sufficient for the purposes of this description to note that the instant invention relates not only to vehicles of the type specifically referred to above but also to other and different types of carts, vehicles or the like in which the feature of collapsibility is desired.

One of the main disadvantages of many of the presently available collapsible carts is their tendency toward complexity, the mechanisms utilized for effecting the collapsibility often consisting of relatively involved linkage systems. Whereas such complexity does not necessarily detract from the effectiveness of the vehicle, it quite often involves a considerable manufacturing cost which must be passed along to the ultimate consumer.

It is, therefore, of primary concern in connection with this invention to provide an improved form of collapsible cart or vehicle wherein the component parts are so arranged to effect the collapsible feature, while at the same time relying only upon a minimum number of parts to effect the desired end result and, consequently, necessitating only a relatively simple yet wholly effective system.

A further object of this invention is to incorporate a wedge or cam member in conjunction with the load carrying portion of a collapsible cart which is cooperable with wheel supporting elements of the cart so as to effect, in the erected position of the parts, a proper positioning of the vehicular wheels and in another or folded position of the load supporting portion, effecting a collapsed position of the vehicular wheels and their supports.

Still another object of this invention is to provide an improved collapsible cart construction embodying a pair of separate and independent wheel frame elements, each carrying associated wheel supporting means and wherein portions of these frame elements are pivotally attached to a load supporting frame element which is of cam or wedge-like construction and with the wheel frame elements being disposed on opposite sides of such cam or wedge portion so that as the load supporting frame portion is rotated about the pivotal axes of the wheel frame elements, relative extension or retraction of the wheel frame elements with respect to each other is accomplished.

A further object of this invention is to provide an improved form of collapsible cart utilizing a pair of upwardly convergent wheel frame elements and an upstanding load carrying frame element having a wedge-like portion sandwiched between the upper end portions of the wheel frame members and pivotally attached thereto about obliquely convergent axes and wherein the load carrying body portion may be swung between a vertically upstanding position with the wheel frame elements spread apart and a vertically depending position with the wheel frame elements disposed in substantially side-by-side relation and on opposite sides of the load carrying frame element.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a perspective view of a collapsible type cart constructed in accordance with this invention and showing the same in fully operative, upright position;

Fig. 2 is a rear elevational view of the assembly shown in Fig. 1 and serving to illustrate the relative relationship of parts when the cart is in its upright, operative position; and Fig. 3 is a view similar to Fig. 2 but showing the relationship of parts when the cart is in its fully collapsed position.

Referring more particularly at this time to Figs. 1 and 2 wherein one form of cart or vehicle constructed in accordance with this invention is shown, reference numerals 10 and 11 are utilized to generally designate wheel support frame elements for the cart. Each, in the specific example shown, will be seen to comprise a rigid framework of generally A-shaped configuration having a pair of downwardly divergent legs 12 and 13 joined at their upper ends is an enlarged plate portion 14 and interconnected in intermediate portions by a generally horizontally disposed bar member 15. In the particular type of construction illustrated, the forward leg 12 of each such frame assembly is longer than the rear leg 13 and each is provided at its lower end with hubs such as those designated by the reference characters 16 and 17 which carry stub axle elements journalling the front and rear wheels 18 and 19 respectively. The front wheels 18 are of smaller diameter than the rear wheels as is more or less conventional in carts of this general type.

The cart also employs a load carrying frame portion designated generally by the reference character 20 which, as will be seen, is of generally open triangular configuration having a generally horizontally disposed load carrying bar portion 21 and a pair of downwardly convergent struts 22 and 23 rigid with the opposite ends of the bar 21 and joined at their lower ends by means of an inverted wedge-like hub 24 having flat opposite face portions 25 and 26 against which the previously mentioned plate portions 14 of the frame elements 10 and 11 are engaged.

Projecting laterally from each of the faces 25 and 26 and perpendicular to a plane passing medially therebetween is a stud element 27 which extends through a suitable aperture in the associated plate portion 14 and which has associated therewith a wing nut 28 serving to clamp the associated plate portion 14 tightly against the corresponding face 25 or 26 so that the frame elements 10, 11 and 20 are, in effect, a single fixed unit.

The load carrying bar 21 may be provided with suitable posts or hook elements such as those designated by the reference characters 29 and 30 for the purpose of suspending the article or articles to be carried and the rearward end of the bar has a horizontally projecting extension 31 which is received between the bifurcated end portion 32 of a handle assembly indicated generally by the reference character 33. A suitable bolt 34 and lock wing nut 35 extends through the elements 31 and 32 and serves to selectively fixedly attach the handle assembly to the load carrying frame, whereby the handle assembly may be disposed either in the normal operative position shown in full lines or the collapsed or inoperative position shown in dotted lines.

The aforementioned plate portions 14 of the wheel support frame elements 10 and 11 are angulated slightly with respect to the leg portions 12 and 13, as will be seen most clearly in Fig. 2, permitting the frame assembly 20 to be rotated 180° from the position shown in Fig. 1 to the position shown in Fig. 3 wherein the load carrying frame portion 20 is sandwiched between the wheel support frame assemblies 10 and 11 to effect movement of the wheels from the spread to the collapsed position by virtue of the action of the wedge-like hub member 24. To effect the collapsed position of the cart, the handle 33 is first loosened and collapsed to the dotted line position as shown in Fig. 1 and thereafter the two wing nuts 28 are loosened and the load carrying frame, together with the handle, swung downwardly between the frame elements 10 and 11 so that the entire unit assumes the compact folded position shown in Fig. 3, whereafter the nuts 28 may be re-tightened to maintain the collapsed position. In the specific example shown, the height of the load carrying frame portion 20 is such that it will just clear between the wheel assemblies while allowing the wheels to remain in contact with the supporting surface, as is clearly shown. However, such a relationship is not absolutely essential for proper operation since the height of the load carrying frame may be either greater or less than that specifically shown in the drawings.

While it is to be understood that the figures of the drawing in the above description serve to illustrate one specific embodiment of this invention, various modifications can be made to not only the wheel support means but also the load carrying frame and the handle without departing from the spirit of this invention. The essential construction is the utilization of a cam or wedge-like member similar in principle to that described in conjunction with the portion 24 so that relative rotation between component parts of the vehicle effect a spreading and collapsing of the wheel support assemblies.

The load supporting body itself may take many different forms and, of course, the wheel support frames may also take other and different forms than that as is specifically disclosed hereinabove and in the drawings.

We claim:

1. A collapsible vehicle comprising a pair of upstanding support members each having a tandem pair of wheels rotatably carried at its lower end, each member having a plate-like upper portion presenting a substantially flat inner surface, a load-carrying frame having a hub portion thereof disposed between said upper portions of the support members, said hub portion forming the lowermost part of the frame and being of wedge-like configuration presenting, on opposite sides thereof, substantially flat, mutually convergent bearing surfaces against which said inner surfaces of the support members are disposed in face-to-face contact, means pivotally connecting said upper portions of the support members to said hub portion of the load-carrying frame whereby the load-carrying frame is movable between a position in which the bearing surfaces of said hub are upwardly convergent to place said wheels in spread apart relation and a position in which the bearing surfaces of the hub are downwardly convergent to place said wheels in closely spaced, collapsed position.

2. A collapsible vehicle comprising a pair of wheel-carrying portions normally disposed in upwardly convergent, spread apart relation, a load-carrying frame having a between hub portion sandwiched between upper end portions of said wheel-carrying portions and pivotally attached thereto for turning in a substantially vertical plane, means for releasably fixing said wheel-carrying portion and said load-carrying frame against relative turning movement, and said portion of the load-carrying frame being of wedge-like configuration whereby relative pivotal movement between such portion and the wheel-carrying portion will move the latter in said plane between the normal, upwardly convergent position and a collapsed, substantially parallel position and said frame being of a height from the hub carrying portion to the frame top to be suspended between the wheel carrying portions when so collapsed.

3. A collapsible vehicle comprising a pair of frame elements normally disposed in upwardly convergent relation and each carrying wheel means at its lower end, a main frame element having a hub portion disposed between and secured to upper portions of the first mentioned frame elements, said hub being so disposed in the lower region of said main frame element that the main frame extends upwardly from between and above the upper portions of said first frame elements, said hub having upwardly convergent sides and said upper portions of the first frame elements being disposed in face-to-face contact therewith, said hub and said upper portions of the first frame elements being selectively pivotable whereby the main frame may be swung downwardly between said first frame elements so as to dispose the sides of said hub in downwardly convergent relation and collapse said first frame elements into substantially parallel position on opposite sides of the main frame.

4. A collapsible vehicle comprising a pair of generally A-shaped frame elements disposed in side-by-side upwardly convergent relation, each of said A-frames having a pair of fore and aft wheels journalled at its lower extremities and each having an upper, apical plate-like portion directed angularly upwardly with respect to the remainder of the A frame so that the plate-like portions of the two A frames present opposed, flat inner surfaces disposed in upwardly convergent relation, a triangular load-carrying frame element having its uppermost side disposed in horizontal position and a hub formed on the apex remote therefrom which is sandwiched between said plate-like portions of the A frames, said hub being of wedge form presenting flat, upwardly convergent opposite sides against which said inner surfaces of the plate-like portions are contacted in face-to-face relation, a pair of pivot studs fixed to opposite sides of said hub and each projecting through a respective plate-like portion, and means releasably holding said load-carrying frame in fixed position between said plate-like portions whereby said load-carrying frame may be rotated 180° to position the opposite sides of said hub in downwardly convergent relation to collapse said A frames into close adjacency on opposite sides of the load-carrying frame.

5. A collapsible cart comprising a load-carrying frame embodying a horizontal top bar and strut bars extending downwardly therefrom, a pair of support elements extending downwardly from said frame in mutually divergent relation to each other, means connecting said support elements to the frame strut bars, each support element having a forward and a rear wheel carried thereby to movably support said frame, said frame bars all lying in a common plane passing between the support elements, said means selectively pivotally connecting the support elements to the frame whereby the latter is movable between a position extending upwardly from the support elements and a position disposed therebetween, and cam means secured to the strut bars, said frame constantly engaged with said support elements to actuate the same between the aforementioned mutually divergent relation when the frame extends above the support elements and a collapsed, side-by-side position when the frame is disposed therebetween.

6. A collapsible vehicle comprising a pair of upstanding support members each having a wheel rotatably carried at its lower end and each having a plate-like upper portion presenting a substantially flat inner surface, a load-carrying frame having a bottom, a hub portion joined to and extending downwardly from said bottom of the frame and disposed between said upper portions of the support members, said hub portion being of wedge-like configuration presenting, on opposite sides thereof, substantially flat, mutually convergent bearing surfaces against which said inner surfaces of the support members are disposed in face-to-face contact, means pivotally connecting said upper portions of the support members to said hub portion of the load-carrying frame whereby the load-carrying frame is movable between a position in which the bearing surfaces of said hub are upwardly convergent to place said wheels in spread apart relation and a position in which the bearing surfaces of the hub are downwardly convergent to place said wheels in closely spaced, collapsed position, and a handle projecting rearwardly from adjacent to the top of said load-carrying frame and selectively pivotally attached thereto for movement into a folded position adjacent and substantially parallel to a side of said load-carrying frame when the vehicle is in the collapsed position.

7. A collapsible vehicle comprising a pair of generally A-shaped frame elements disposed in side-by-side upwardly convergent relation, each of said A-frames having a pair of fore and aft wheels journalled at its lower extremities and each having an upper, apical plate-like portion directed angularly upwardly with respect to the remainder of the A frame so that the plate-like portions of the two A frames present opposed, flat inner surfaces disposed in upwardly convergent relation, a triangular load-carrying frame element having its uppermost side disposed in horizontal position and a hub formed on the apex remote therefrom which is sandwiched between said plate-like portions of the A frames, said hub being of wedge form presenting flat, upwardly convergent opposite sides against which said inner surfaces of the plate-like portions are contacted in face-to-face relation, a pair of pivot studs fixed to opposite sides of said hub and each projecting through a respective plate-like portion, and means releasably holding said load-carrying frame in fixed position between said plate-like portions whereby said load-carrying frame may be rotated 180° to position the opposite sides of said hub in downwardly convergent relation to collapse said A frame into close adjacency on opposite sides of the load-carrying frame, a handle projecting rearwardly from said load-carrying frame and selectively pivotally attached thereto for movement into folded position with respect to said load-carrying frame when the vehicle is in the collapsed position.

8. The invention according to claim 7 wherein the said uppermost side of the load carrying frame has a substantially horizontal end extension and said handle bar has a bifurcated end portion receiving the end of said extension and the said pivotal attachment facilitating placing the handle when folded in relatively close parallel relation with the adjacent side of the frame.

9. A collapsible vehicle comprising a pair of generally A-shaped frame elements disposed in side-by-side upwardly convergent relation, each of said A-frames having a pair of fore and aft wheels journaled at its lower extremities and each having an upper, apical plate-like portion directed angularly upwardly with respect to the remainder of the A-frame so that the plate-like portions of the two A-frames present opposed, flat inner surfaces disposed in upwardly convergent relation, a load-carrying frame element having an elongate uppermost side portion disposed in horizontal position and a lower portion, a hub formed on the lower portion and sandwiched between said plate-like portions of the A-frames, said hub being of wedge form presenting flat, upwardly convergent opposite sides against which said inner surfaces of the plate-like portions are contacted in face-to-face relation, a pair of pivot studs carried by and extending from opposite sides of said hub and each projecting through a respective plate-like portion, and means releasably holding said load-carrying frame in fixed position between said plate-like portions whereby said load-carrying frame may be rotated 180° to position the opposite sides of said hub in downwardly convergent relation to collapse said A-frames into close adjacency on opposite sides of the load-carrying frame.

10. A collapsible vehicle comprising a pair of generally A-shaped frame elements disposed in side-by-side upwardly convergent relation, each of said A-frames having a pair of fore and aft wheels journaled at its lower extremities and each having an upper, apical plate-like portion directed angularly upwardly with respect to the remainder of the A-frame so that the plate-like portions of the two A-frames present opposed, flat inner surfaces disposed in upwardly convergent relation, a load-carrying frame element having an uppermost side portion disposed in horizontal position and a lower portion, a hub formed on the lower portion and sandwiched between said plate-like portions of the A-frames, said hub being of wedge form presenting flat, upwardly convergent opposite sides against which said inner surfaces of the plate-like portions are contacted in face-to-face relation, a pair of pivot studs carried by and extending from opposite sides of said hub and each projecting through a respective plate-like portion, and means attached to the studs for releasably holding said load-carrying frame in fixed position between said plate-like portions whereby said load-carrying frame may be rotated 180° to position the opposite sides of said hub in downwardly convergent relation to collapse said A-frames into close adjacency on opposite sides of the load-carrying frame, a handle projecting rearwardly from said load-carrying frame and selectively pivotally attached thereto for movement into folded position with respect to said load-carrying frame when the vehicle is in the collapsed position.

11. A collapsible vehicle comprising a pair of frame elements normally disposed in upwardly convergent relation and each carrying wheel means at its lower end, a main frame element having a hub portion disposed between and secured to upper portions of the first mentioned frame elements, said hub being disposed in the lower region of said main frame element such that the main frame extends upwardly from between the upper portions of said first frame elements, said hub having upwardly convergent sides and said upper portions of the first frame elements being disposed in face-to-face contact therewith, said hub and said upper portions of the first frame elements being selectively pivotable whereby the main frame may be swung downwardly between said first frame elements so as to dispose the sides of said hub in downwardly convergent relation and collapse said first frame elements into closely spaced relation on opposite sides of the main frame, a handle projecting rearwardly from said main frame and selectively pivotally attached thereto so as to be folded thereagainst when the vehicle is collapsed, and said main frame being of such height so as to be completely contained in suspension between said first mentioned frame elements when the latter are upright in the collapsed frame position.

References Cited in the file of this patent

UNITED STATES PATENTS

| | | |
|---|---|---|
| 2,599,354 | Stableford | June 3, 1952 |
| 2,659,612 | Williamson | Nov. 17, 1953 |
| 2,717,785 | Ray | Sept. 13, 1955 |
| 2,793,871 | Stableford | May 28, 1957 |